United States Patent [19]
Tsunoda

[11] Patent Number: 6,005,726
[45] Date of Patent: Dec. 21, 1999

[54] APPARATUS FOR COMPENSATING THERMAL ASPERITY AND DC UNDERSHOOT IN THE DATA CHANNEL OF A DISK STORAGE SYSTEM

[75] Inventor: Masahiko Tsunoda, Tokyo, Japan

[73] Assignee: Kabushiki Kaisha Toshiba, Kawasaki, Japan

[21] Appl. No.: 08/895,911

[22] Filed: Jul. 17, 1997

[30] Foreign Application Priority Data

Sep. 20, 1996 [JP] Japan ................................ 8-250558

[51] Int. Cl.$^6$ ................................ G11B 5/09; G11B 5/02
[52] U.S. Cl. ................................ 360/46; 360/25
[58] Field of Search ................................ 360/113, 46, 67, 360/75, 51, 25; 324/252; 327/58, 179; 371/40.14, 40.3

[56] References Cited

U.S. PATENT DOCUMENTS

| | | |
|---|---|---|
| 5,233,482 | 8/1993 | Galbraith et al. . |
| 5,497,111 | 3/1996 | Cunningham ................................ 327/58 |
| 5,715,110 | 2/1998 | Nishiyama et al. ................................ 360/67 |
| 5,808,825 | 9/1998 | Okamura ................................ 360/75 |
| 5,818,656 | 10/1998 | Klaassen et al. ................................ 360/67 |
| 5,838,512 | 11/1998 | Okazaki ................................ 360/51 |

FOREIGN PATENT DOCUMENTS

| | | |
|---|---|---|
| 6-28785 | 2/1994 | Japan . |
| 7-57202 | 3/1995 | Japan . |

OTHER PUBLICATIONS

K.B. Klaassen, "Magnetic Recording Channel Front–Ends", IEEE Transactions on Magnetics, 4506–4508, Nov. 1991.

Primary Examiner—W. Chris Kim
Attorney, Agent, or Firm—Limbach & Limbach LLP

[57] ABSTRACT

A read channel for use in a disk drive having an MR head. The read channel comprises a compensation device which has a high-pass filter (HPF) for compensating a thermal asperity (TA). The read channel suppresses level changes of a data signal which have resulted from TA disturbance present in the data signal. The read channel has a switch circuit connected to the input of the HPF, for canceling the DC undershoot present in the data signal. The switch circuit maintains the DC level of the data signal at zero level while a thermal asperity is being detected in the data signal.

5 Claims, 11 Drawing Sheets

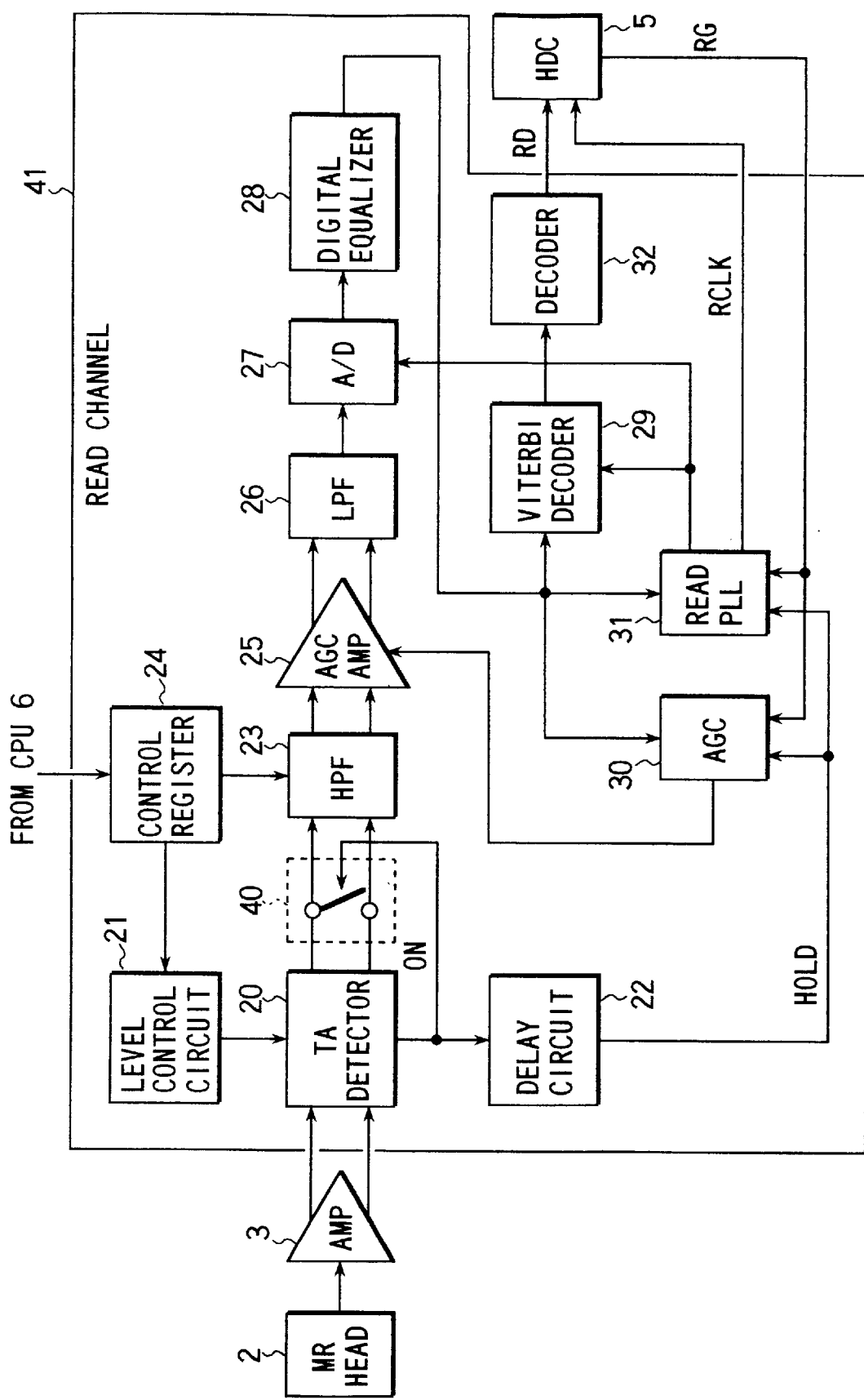
F I G. 1

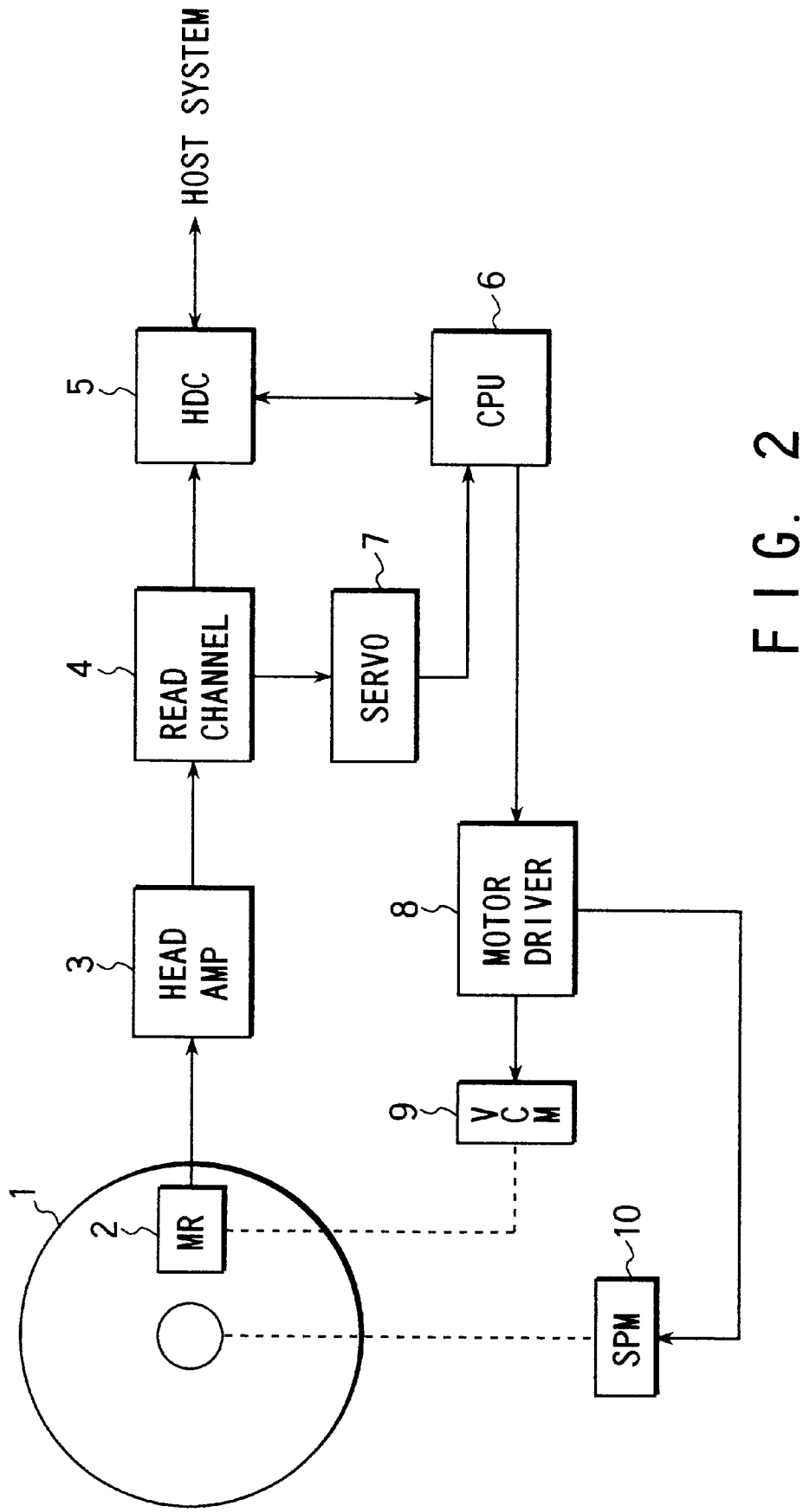
F I G. 2

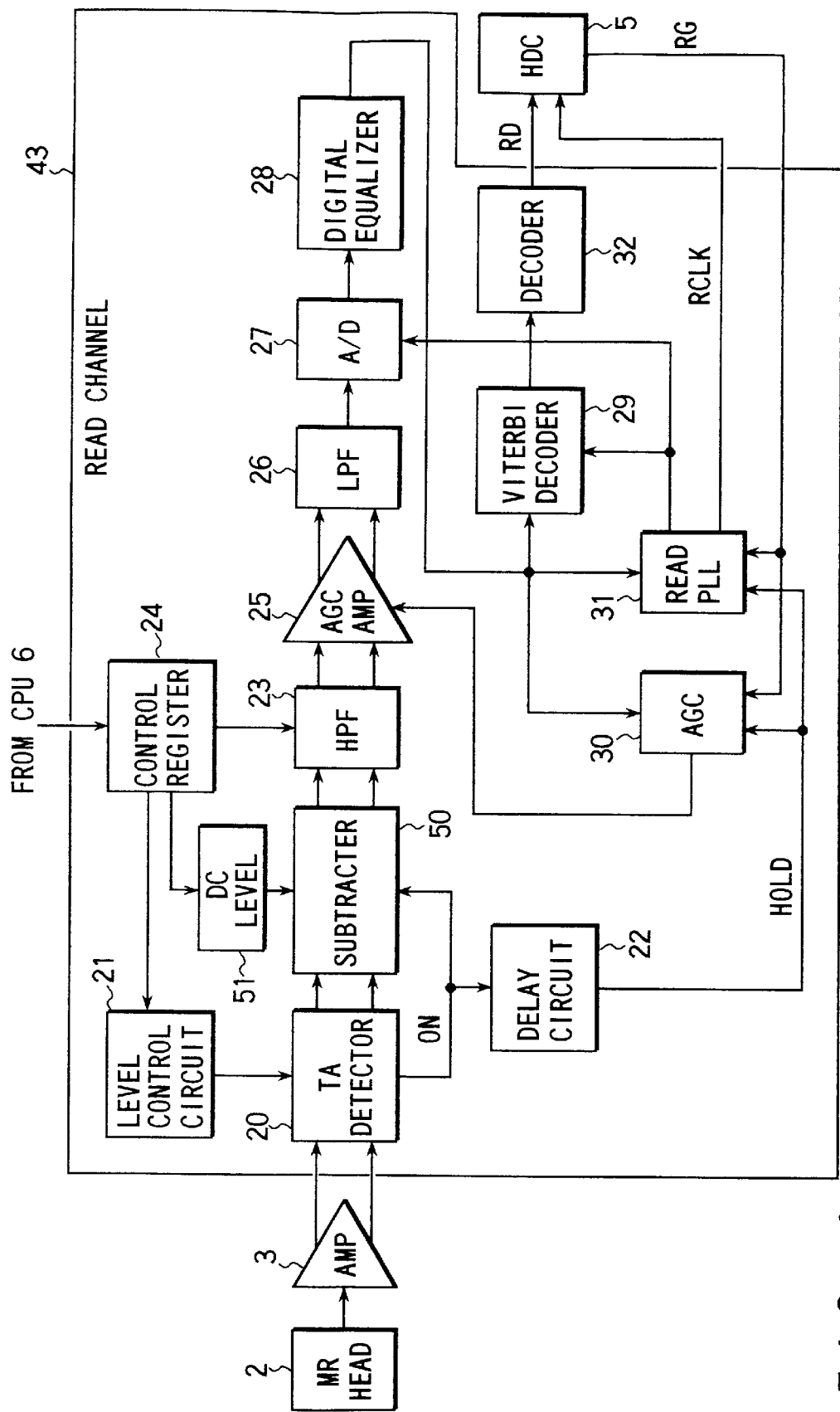
F I G. 4

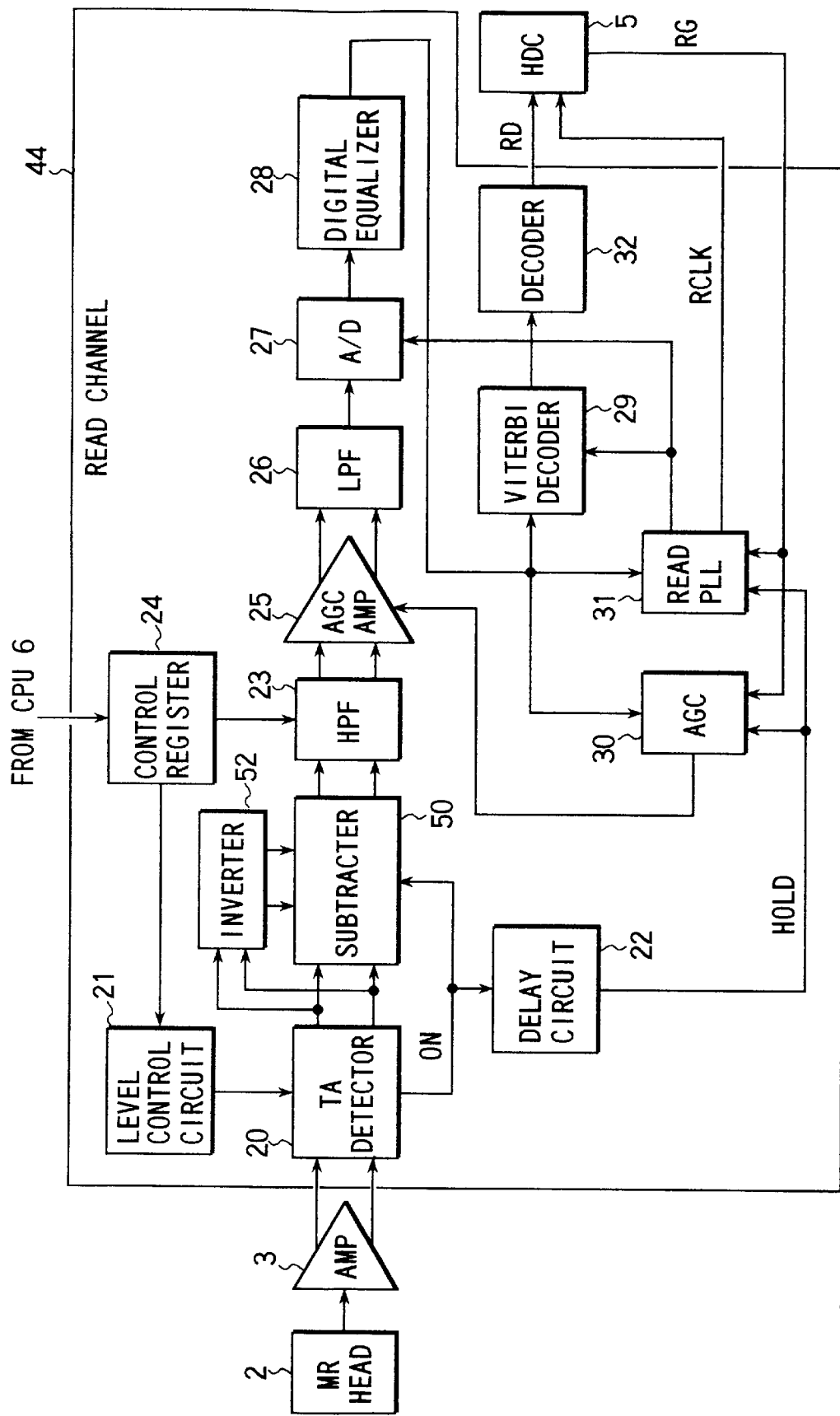
F I G. 5

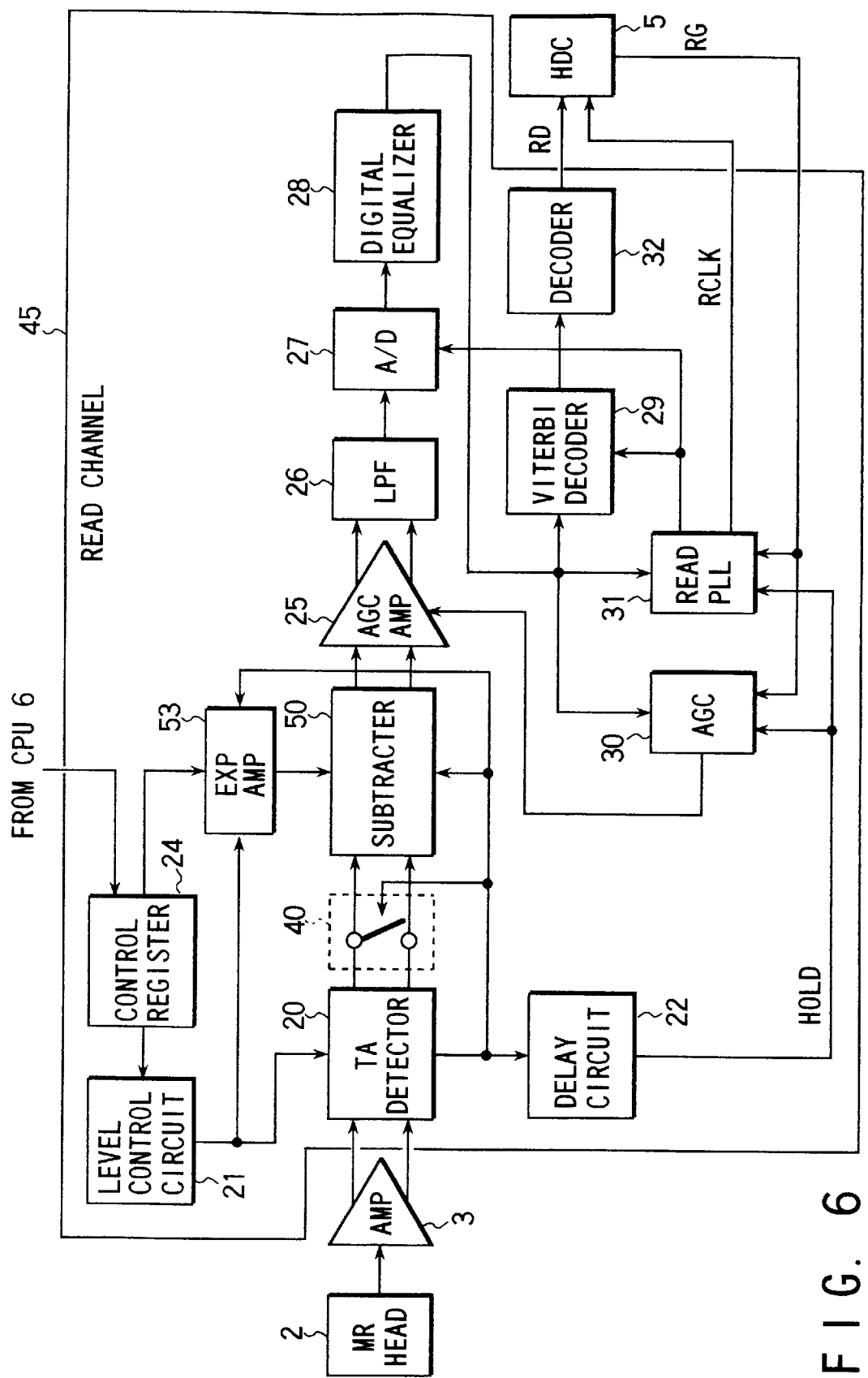
F I G. 6

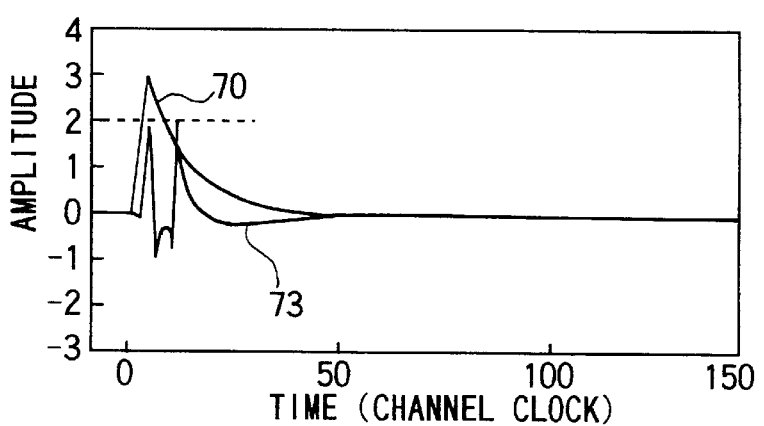
F I G. 7C
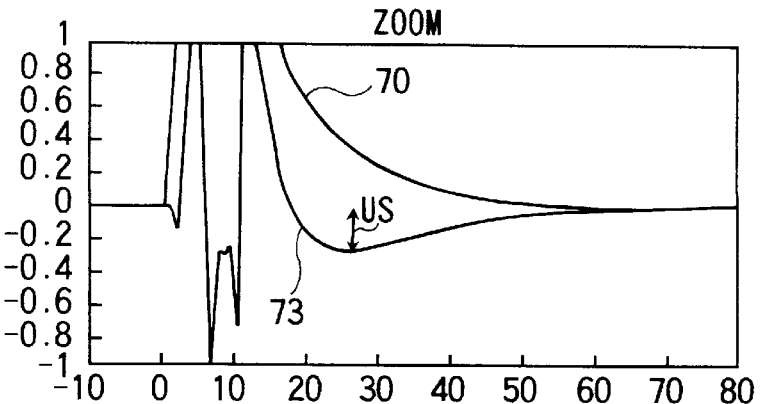
F I G. 7D

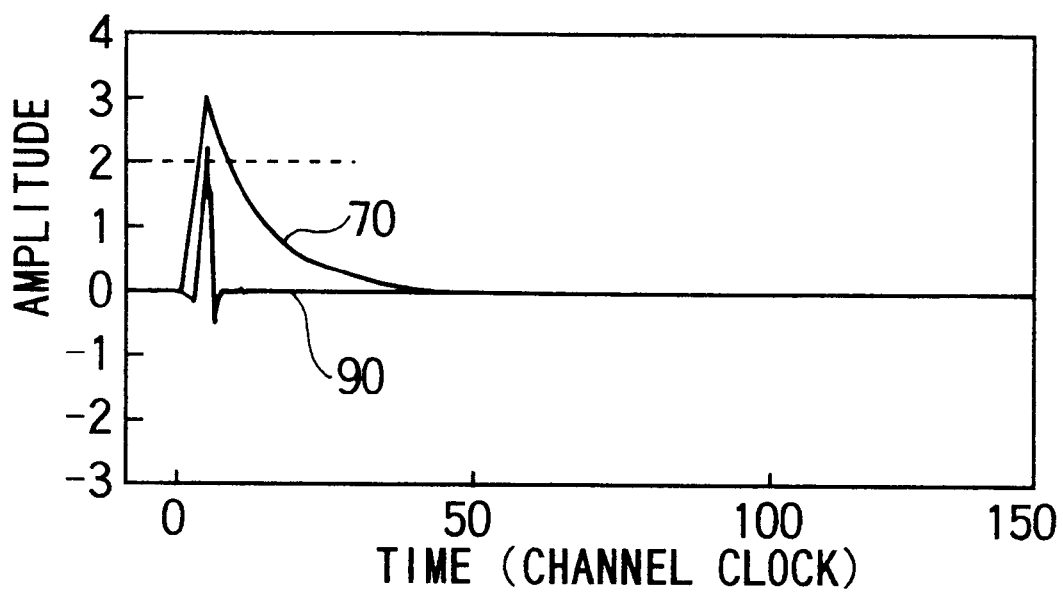
F I G. 9A
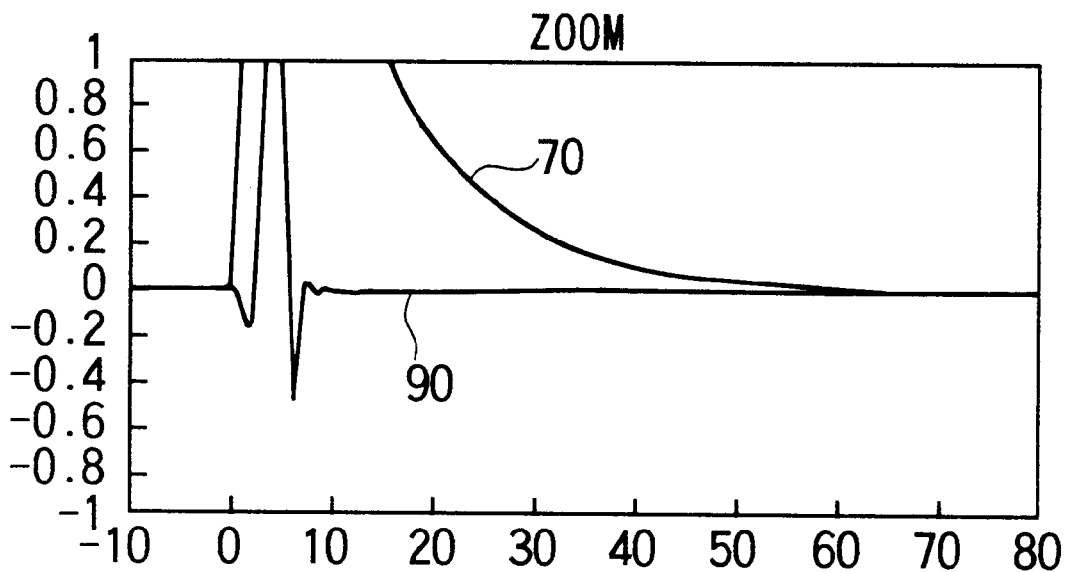
F I G. 9B

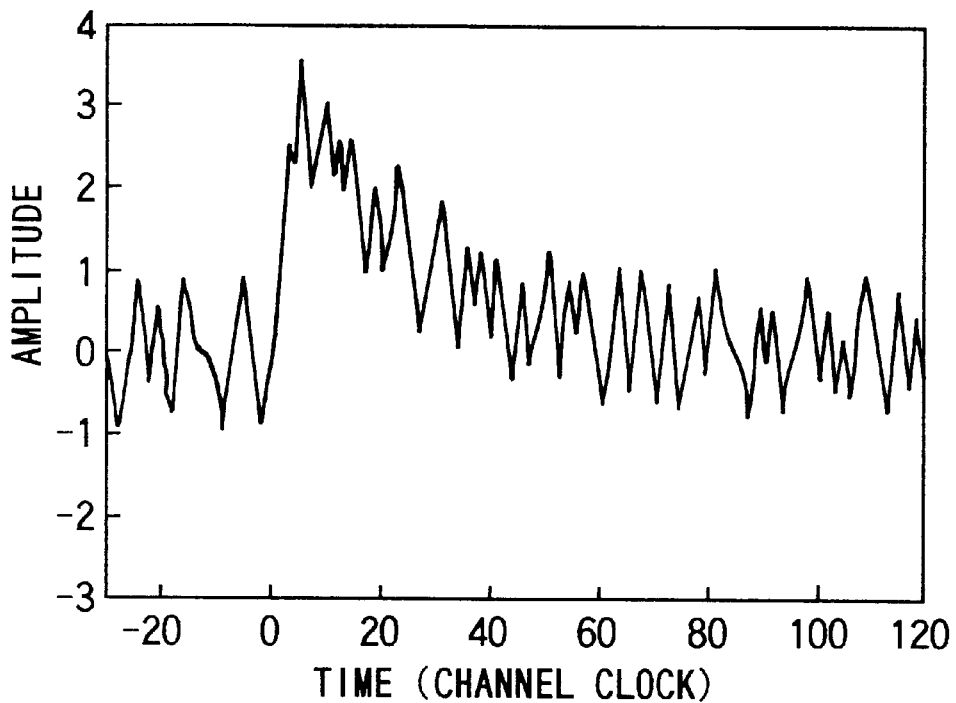
F I G. 1 1 A  PRIOR ART
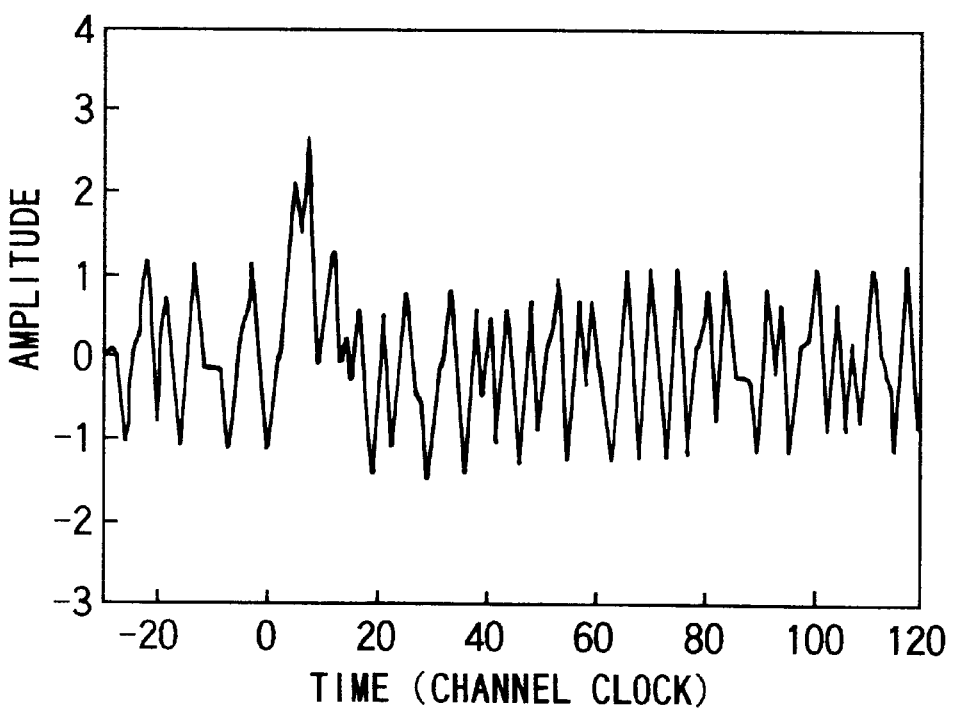
F I G. 1 1 B  PRIOR ART

APPARATUS FOR COMPENSATING THERMAL ASPERITY AND DC UNDERSHOOT IN THE DATA CHANNEL OF A DISK STORAGE SYSTEM

BACKGROUND OF THE INVENTION

The present invention relates to an apparatus for compensating a thermal asperity in the data channel of, for example, a hard disk drive which has an MR (Magenetoresitive) head used as a read head.

In recent years, attention is paid to hard disk drives (HDDs) with a read/write head which comprises an MR head used as the read head and an inductive head used as the write head. The read/write head of this type is advantageous in terms of data-recording and data-reproducing efficiency because each head can be modified for higher operating efficiency. The MR head is a component whose resistance changes with the intensity of the magnetic flux emanating from a magnetic disk. The changes in the resistance of the MR head are detected by the data-reproducing unit incorporated in the HDD. The data-reproducing unit converts the resistance changes to signal voltages. The data channel (read channel) of the HDD processes the signal voltages, whereby data is reproduced from the disk.

In the HDD, both the read head (MR head) and the write head (inductive head) are mounted on a head slider. The head slider moves, floating above the disk, so that the read head may read data from the disk and the write head may record data on the disk. More precisely, the head slider moves as if flying over the disk at an extremely small flying height of, for example, about 50 nm. Recently the flying height is reduced to increase the SIN ratio of data signals in proportion to the density at which data is recorded on the disk. The less the flying height, the greater the possibility that the lower surface of the head slider contacts the disk while moving over the disk.

Mounted on the lower surface of the head slider is the MR head (read head). If the MR head collides with the disk, an impact energy will be generated. The impact energy raises the temperature of the MR head, greatly changing the resistance of the MR head. As a consequence, the data signal (read signal) the MR head produces has its amplitude (i.e., DC level) changed very much as is shown in FIG. 11A.

The phenomenon that the resistance of the MR head greatly changes with the temperature of the MR head is known as "thermal asperity (TA)." The thermal asperity (TA) results in changes in the DC level of the data signal (i.e. thermal disturbance). To be more specific, the DC level (amplitude) of the data signal sharply increases as the temperature of the MR head rises and exponentially decreases as the heat is radiated from the MR head, lowering the temperature thereof.

Once the amplitude of the data signal changes due to the thermal asperity, it cannot be correctly processed (or demodulated) in the read channel of the HDD until it regains the normal level. This imposes an adverse influence on the AGC (Automatic Gain Control) amplifier provided in the read channel. The AGC amplifier is a feedback circuit designed to maintain the data signal at a constant level. Thus the thermal asperity renders it difficult for the read channel to reproduce data from the disk. In other words, the thermal asperity is a cause for an increase of the read-error rate.

In the conventional HDD, the disk controller (HDC) provided for control of the transfer of data has the function of correct read errors. The disk controller can correct burst errors caused by a thermal asperity (TA) which terminates in a relatively short time. A TA-compensating method has been developed in which a high-pass filter (HPF) is used in the read channel to terminate the change in the signal DC level (thermal disturbance) quickly. This TA-compensating method can terminate the change in the signal DC level quickly within a relatively short time as seen from FIG. 11B.

FIG. 10 shows a read channel 4 for use in an HDD, which processes digital signals of PRML (Partial Response Maximum Likelihood) type. In the read channel 4, the HPF 23 for compensating a thermal asperity (TA) is connected to the input of the AGC amplifier 25, and the TA detector 20 is connected to the input of the HPF 23. The TA detector 20 receives a read signal supplied from the MR head 2 and amplified by a head amplifier 3, for detecting the change in the DC level (i.e., thermal disturbance) of the read signal.

The TA detector 20 detects the change in the DC level of the read signal (i.e., the output signal of the head amplifier 3), on the basis of the reference level (known as "slice level) set by a device provided outside the read channel, i.e., the CPU incorporated in the HDD. The TA detector 20 generates a signal representing the change in the DC level of the read signal.

In the read channel 4, the output signal of the TA detector 20 is supplied to the delay circuit 22. The delay circuit 22 generates a hold signal HOLD from the output signal of the TA detector 20. The signal HOLD has a pulse width which corresponds to the sum of the TA-detecting time and the prescribed delay time of the circuit 22. The signal HOLD is supplied to the AGC circuit 30 and the read PLL 31, prohibiting both the AGC circuit 30 and the read PLL 31 from receiving data signals for the period corresponding to the pulse width of the signal HOLD. As long as the AGC circuit 30 and the read PLL 31 are prohibited from receiving data signals, any data signal that has an abnormal amplitude for several bits is not input to the AGC circuit 30 or the read PLL 31, even if its DC level change is reduced by the HPF 23.

The HPF 23 is a programmable filter having parameters (such as the cutoff frequency fc) each of which can be set to different values by the CPU. The read channel 4 further comprises a low-pass filter (LPF) 26, an A/D converter 27, a digital equalizer 28, a viterbi decoder (detector) 29, and a decoder 32. The viterbi decoder 29 performs data-decoding (data-detection) of ML (Maximum Likelihood) type. The decoder 32 decodes the read data to write data (RD), which is supplied to the HDC 5. The read channel 4 is activated by a read gate signal (RG) supplied from the HDC 5. The read PLL 31 supplies a timing clock signal to the A/D converter 27 and the viterbi decoder 29. The read PLL 31 also supplies a read clock signal (i.e., channel clock signal) RCLK to the HDC 5. The AGC circuit 30 outputs a control signal for controlling the the gain of the AGC amplifier 25, which is provided to maintain the read signal at a constant level.

To terminate the change in the signal DC level within the shortest time possible, it is desired that the cutoff frequency fc of the HPH 23 be as high as possible. However, the higher the cutoff frequency fc of the HPF 23, the more the phase characteristic of the waveform of the read signal is deteriorated in the low-frequency band. Hence, the efficiency at which the HPF 23 compensates the thermal asperity (TA) needs to be traded off with the efficiency at which the read channel reproduce data from the disk.

As can be understood from FIGS. 11A and 11B, it is assumed that the DC level of the read signal changes about three times as much as it does in normal conditions. How much the DC level changes depends upon how much the temperature of the MR head rises due to the collision of the MR head with the disk. The time required to cool the MR head to the initial temperature varies with the rotational speed of the disk and the temperature outside the HDD. The number of bits making a read-burst error depends on the density at which data is recorded on the disk. In view of these points, it is desired that the cutoff frequency fc of the HPF 23 should be a variable one.

The change in the DC level of the read signal can be reduced by using the HPF 23 to compensate the thermal asperity (TA), as is seen from the waveform 72 shown in FIG. 7A which is the waveform of the output of the LPF 26. In FIG. 7A, the waveform 70 pertains to the output of the head amplifier 3, and the waveform 71 to the output the LPF 26 might generate if the HPF 23 were not provided. Were the thermal asperity (TA) not compensated for, the LPF 26 would generate an output having the waveform 71, not an output having the waveform 72. For convenience, only the DC components of the outputs of the head amplifier 3, HPF 23 and LPF 26 are shown in FIG. 7A and it is assumed that the DC levels of these outputs change about three times as much as they do in normal conditions and that the cutoff frequency fc of the HPF 23 is about 0.03 times the frequency of the channel clock signal RCLK of the read channel 4. As clearly seen from the waveforms 71 and 72, the change in the DC level of the read signal decreases within a short time since the HPF 23 compensates the thermal asperity (TA).

FIG. 7B is an enlarged graph, showing a part of the graph of FIG. 7A. As shown in FIG. 7B, the output signal 72 of the HPH 23, i.e., the TA-compensated read signal remains at a negative DC level for a relatively long time. This phenomenon, known as "DC undershoot (US)," will increase the read-error rate in the read channel 4, particularly in the viterbi decoder 29. Although the HPH 23 compensates the thermal asperity (TA) to suppress the change in the DC level of the read signal, it causes an DC undershoot, inevitably increasing the read-error rate in the read channel 4.

BRIEF SUMMARY OF THE INVENTION

The object of the present invention is to provide an apparatus which has an HPF for compensating a thermal asperity and which can not only compensate thermal asperity but also reduce the DC undershoot in a read-signal waveform, thereby to decrease a read-error rate.

To attain the object, an apparatus (i.e., a read channel) according to the present invention, designed to compensate a thermal asperity and reduce the DC undershoot in a read signal, comprises: TA-detecting means for detecting a thermal asperity (TA) from a level change of a data signal read from an MR head and generating a detection signal representing the thermal asperity detected; first compensation means for compensating a change in the DC component in the data signal in accordance with the level of the detection signal generated by the TA-detecting means; and second compensation means for compensating the DC undershoot in the read signal in accordance with the detection signal generated by the TA-detecting means.

Comprising these means, the apparatus can compensate a thermal asperity during the processing of a data signal read by an MR head and can reduce the DC undershoot in the data signal. The apparatus can therefore decrease a read-error rate in it.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the main part of a read channel according to an embodiment of the present invention;

FIG. 2 is a block diagram showing the main part of hard disk drive incorporating the read channel shown in FIG. 1;

FIGS. 3 to 6 are block diagrams showing the main parts of modifications of the read channel shown in FIG. 1;

FIGS. 7C, 7D, 8A, 8B, 8C, 8D, 9A and 9B are graphs representing the results of the TA compensation according to the present invention;

FIGS. 11A and 11B are graphs illustrating data signals with thermal disturbance.

DETAILED DESCRIPTION OF THE INVENTION

Figure 3:
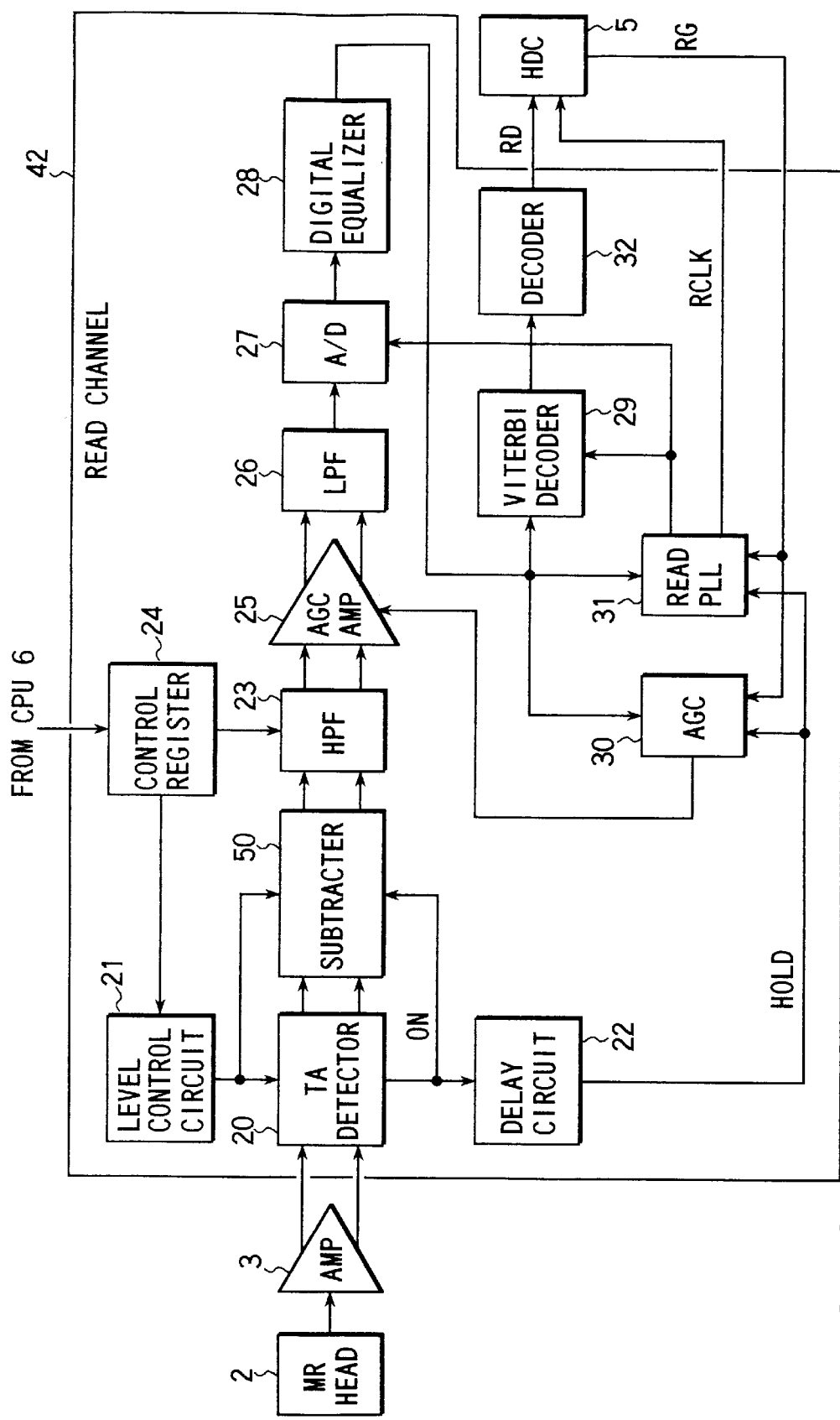

Embodiments of this invention will be described with reference to the accompanying drawings.

(Structure of the HDD)

FIG. 2 shows an HDD which incorporates a read channel 41 according to the invention. As shown in FIG. 2, the HDD has a read/write head which comprises an MR head 2 and an inductive head (nots shown). The MR head 2 and the inductive head are used as the read head and the write head, respectively. The read/write head is supported by a head actuator (not shown). The head actuator is moved by a voice coil motor (VCM) 9 in the radial direction of a disk 1 which is a data-recording medium. The disk 1 is connected to the shaft of a spindle motor 10, in most cases together with one or more other disks. The spindle motor 10 rotates the disk 1 at high speed. Both the VCM 9 and the spindle motor 10 are driven by a motor driver 8 which is controlled by a CPU 6.

The MR head 2, a head amplifier 3, the read channel 41, an HDC 5 and the CPU 6 constitute the data-reproducing unit of the HDD. The head amplifier 3 amplifies a read signal generated by the MR head 2. The read signal amplified is supplied to the read channel 41 which is a digital PRML data channel. The read channel 41 performs PRML process on the read signal, demodulating the read signal or reproducing write data (i.e., user data and servo data) from the disk 1. The read data (i.e., the user data RD) thus reproduced is supplied to the HDC 5.

The HDC 5 functions as the interface between the HDD and a host system (e.g., a personal computer). The HDC 5 also performs various data controls; it controls the transfer of read data and write data, processes commands (addresses), checks errors in the read data. The CPU 6 is the main control device in the HDD. The CPU 6 is used to set control data, such as the parameters of an HPF 23, through a control register 24. (The HPF 23 and the control register 24 are incorporated in the read channel 41 and will be described later.)

The HDD further comprises a servo circuit 7. The servo circuit 7 receives the read signal reproduced by the read channel 14. From the read signal the circuit 7 generates servo data which is required to move the MR head 2 to a position on the disk 1, where the MR head 2 read data from the disk 1. The servo data is supplied to the CPU 6. On the basis of the servo data the CPU 6 controls the motor driver 8. So controlled, the motor driver 8 drives the voice coil motor 9, whereby the MR head 2 is moved to that position on the disk 1.

(Read Channel and TA Compensation)

As shown in FIG. 1, the read channel 41 comprises a TA detector 20, a level control circuit 21, a delay circuit 22, a high-pass filter (HPF) 23, a control register 24, an AGC amplifier 25, a low-pass filter (LPF) 26, an A/D converter 27, a digital equalizer 28, a viterbi decoder 29, an AGC circuit 30, a read PLL 31, and a decoder 32. The read channel 41 has a switch circuit 40 connected between the TA detector 20 and the HPF 23 which functions as a TA-compensating circuit. The switch circuit 40 is closed upon receipt of a detection signal supplied from the TA detector 20, short-circuiting the differential input of the HPF 23. In other words, the circuit 40 changes the DC level of the read signal supplied to the HPF 23 to level 0. The switch circuit 40 remains closed while the TA detector 20 is detecting a thermal asperity (TA).

The control register 24 stores a data item representing the reference level set by the CPU 6. The level control circuit 21 receives the data item from the register 24 and generates a reference level signal from the data item. The reference level signal is supplied to the TA detector 20, which is a comparator having an operation amplifier. The TA detector 20 detects changes in the DC level of the read signal supplied from the MR head 2, by comparing the same with the reference level (i. e., slice level). Upon detecting a change of the DC level, the TA detector 20 generates a detection signal ON. The signal ON is supplied to the delay circuit 22.

In response to the detection signal ON from the TA detector 20, the delay circuit 22 generates a hold signal HOLD having a pulse width corresponding to the sum of the delay time which the circuit 22 has and the period during which the detector 20 detects the thermal asperity (TA). The signal HOLD is supplied to the AGC circuit 30 and the read PLL 31, and neither the circuit 30 nor the PLL 31 operates while the delay circuit 22 keeps generating the signal HOLD.

Figure 10:
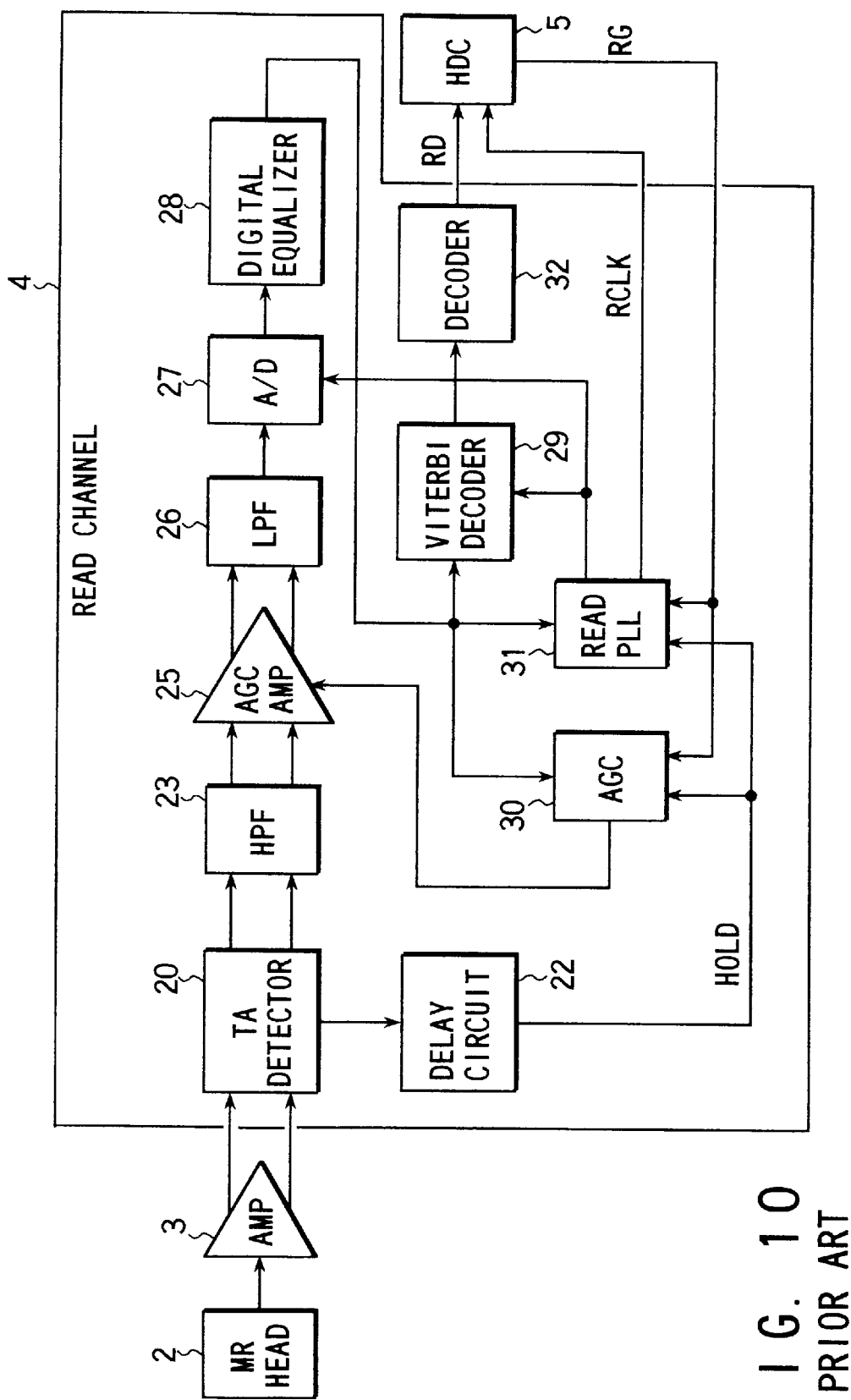
FIG. 10 is a block diagram showing the main part of a conventional read channel.

The HPF 23 is a programmable high-pass filter having parameters (such as the cutoff frequency fc) each of which can be set different values by the CPU and can be registered in he control register 24. The components of the read channel 41, other than the TA detector 20, level control circuit 21, delay circuit 22, HPF 23, control register 24 and switch circuit 40, are identical to those which are incorporated in the conventional digital PRML-type read channel illustrated in FIG. 10.

How the thermal asperity (TA) is compensated in the read channel 41 will be explained, with reference to FIGS. 7C and 7D.

In the HDD shown in FIG. 2, the HDC 5 receives a read command supplied from the host system and supplies the same to the CPU 6. Upon receipt of the read command the CPU 6 controls the motor driver 8. The motor driver 8 drives the VCM 9, which moves the MR head 2 to a desired track on the disk 1. The position of the desired track is determined by a logic address which is contained in the read command.

The MR head 2 reads the data recorded in the target track on the disk 1 and converts the data into a read signal. The read signal is supplied to the head amplifier 3. The amplifier 3 amplifies the read signal, which is input to the reach channel 41.

In the read channel 41 shown in FIG. 1, the TA detector 20 outputs no detection signal ON as long as it detects no changes in the DC level of the read signal. In this case, the read channel 41 performs PRML process on the read signal. That is, the AGC circuit 30, LPF 26, digital equalizer 28, viterbi decoder 29 and decoder 32 convert the read signal to read data RD identical to the data recorded on the disk 1.

Figure 7A:
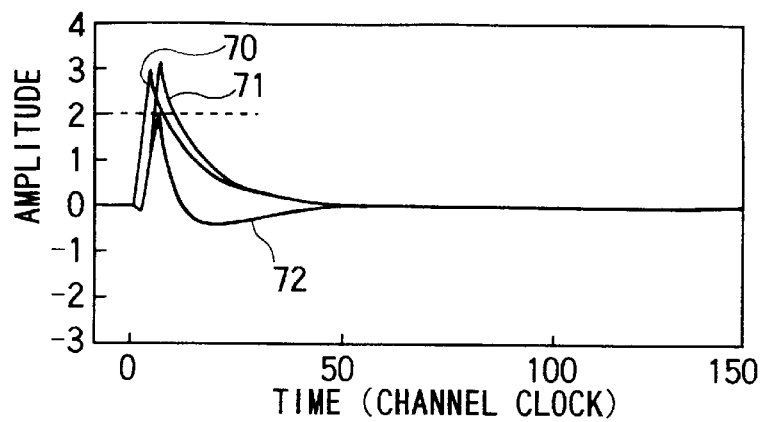
FIGS. 7A and 7B are graphs illustrating the results of conventional TA compensation.

The DC level of the read signal 70 output from the head amplifier 3 may change, rising above the reference level (i.e., amplitude 2) as shown in FIG. 7C. In this case, the TA detector 20 generates a detection signal ON which remains at high level until the DC level of the read signal 70 falls to the reference level 2. The detection signal ON is supplied to the delay circuit 22. The delay circuit 22 generates a hold signal HOLD, which is supplied to the AGC circuit 30 and the read PLL 31. The circuit 30 and the PLL 31 therefore do not perform their functions while the delay circuit 22 keeps generating the signal HOLD.

Meanwhile, the detection signal ON is supplied to the switch circuit 40, too. The switch circuit 40 is closed, short-circuiting the differential input of the HPF 23. In other words, the switch circuit 40 changes the DC level of the read signal supplied to the HPF 23 to level 0. The switch circuit 40 is opened when the TA detector 20 stops generating the detection signal ON.

The HPF 23 receives a read signal which has changed in DC level due to a thermal asperity (TA). It compensates the thermal asperity, thereby reducing the change of the DC level. As a result, the DC level of the read signal (73) input to the HPF 23 remains at level 0 for the time corresponding to the period during which the read signal input to the HPF 23 is changing in terms of DC level, as is illustrated in FIG. 7C. As seen from FIG. 7D which is an enlarged part of FIG. 7C, the output (73) of the LPF 26, i.e., the TA-compensated read signal output by the HPF 23, has its DC undershoot far more reduced than in the conventional read channel (see FIG. 7B). In other words, the output of the LPF 26 remains at a negative DC level but for a much shorter time than the output of the LPF used in the conventional read channel shown in FIG. 10.

As may be understood from the above, the HPF 23 not only decreases the change in the DC level of the read signal, but also reduces the DC undershoot of the read signal. The DC undershoot is reduced because the switch circuit 40 changes the DC level of the read signal to level 0. Thus, any read signal processed in the read channel 41 is one that has been TA-compensated to have its DC-level change and its DC undershoot minimized. The error rate in data detection in the decoder 29, in particular, can be decreased to achieve reliable reproduction of data.

(Modifications of the Embodiment)

A few modifications of the embodiment described above will described, with FIGS. 3 to 6.

FIG. 3 illustrates a read channel 42 which is the first modification of the embodiment (FIG. 1). As the comparison of FIGS. 1 and 3 shows, the first modification differs from the embodiment in that a subtracter 50 is used in place of the switch circuit 40 and connected to the input of the HPF 23. The subtracter 50 is an operational amplifier and operates in response to a detection signal ON generated by the TA detector 20. The reference level registered in the control register 24 is set into the subtracter 50 through the level control circuit 21. The subtracter 50 converts the read signal (i.e., the input to the HPF 23) to a negative voltage of the same level as the reference level. That is, the subtracter 50 sets the DC level of the read signal at a negative voltage of the same level, or applying a DC cancel voltage to the read signal which has changed in DC level.

Figure 8A:
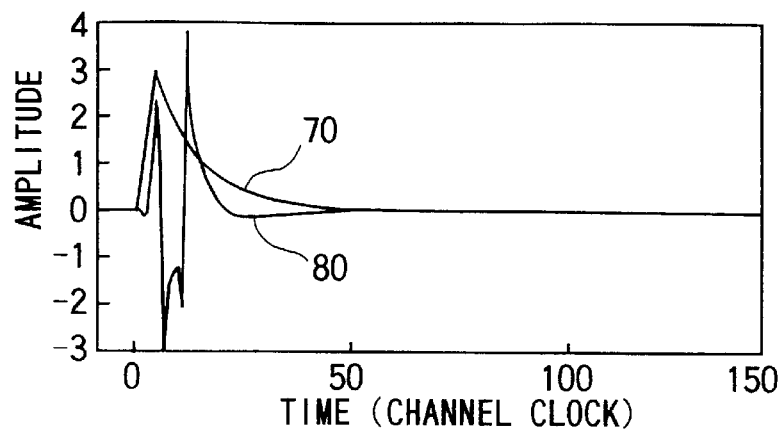

The DC level of the read signal 70 output from the head amplifier 3 may rise above the reference level as shown in FIG. 8A. If this is the case, the TA detector 20 generates a detection signal ON which lasts for the time the DC level of the signal 70 remains above the reference level. The detection signal ON is supplied to the delay circuit 22 and the subtracter 50. In response to the signal ON the delay circuit 22 generates a hold signal HOLD, which is supplied to the AGC circuit 30 and the read PLL 31. Hence, neither the circuit 30 nor the PLL 31 operates while the delay circuit 22 keeps generating the signal HOLD.

In the meantime, the subtracter 50 is turned on by the detection signal ON generated by the TA detector 20 and applies a DC cancel voltage to the read signal which is the differential input to the HPF 23. The HPF 23 performs TA compensation, reducing the the DC-level change in the read signal, which has been caused by the thermal asperity (TA). As a result, the DC level of the read signal input to the HPF 23 remains at level 0 for the time corresponding to the period during which the read signal input to the HPF 23 is changing in terms of DC level, as is illustrated in FIG. 8A.

Figure 7B:
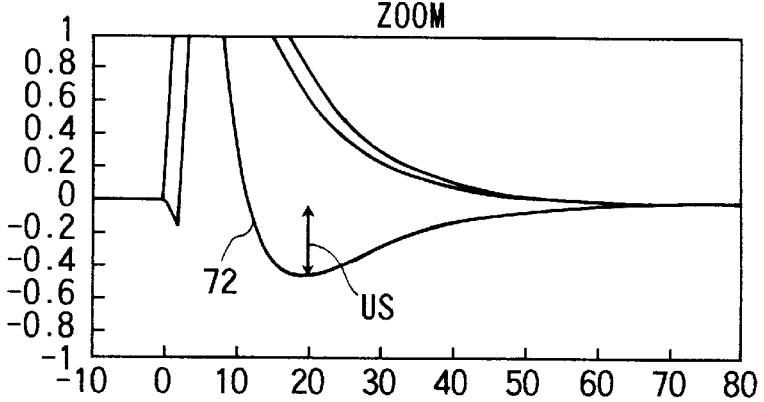
Figure 8B:
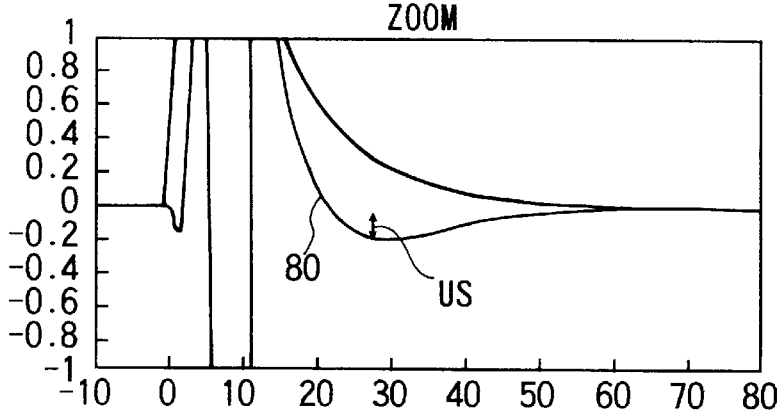

As seen from FIG. 8B which is an enlarged part of FIG. 8A, the output 80 of the LPF 26, i.e., the TA-compensated read signal output by the HPF 23, has its DC undershoot far more reduced than in the conventional read channel (see FIG. 7B). In other words, the output of the LPF 26 remains at a negative DC level but for a much shorter time than the output of the LPF used in the conventional read channel shown in FIG. 10.

In terms of the other operations it performs, the read channel 42 is identical to the read channel 41 illustrated in FIG. 1.

FIG. 4 shows a read channel 43 which is the second modification of the embodiment (FIG. 1). As the comparison of FIGS. 3 and 4 teaches, the second modification differs from the first modification in that a DC-level setting circuit 51 is connected between the control register 24 and the subtracter 50. The DC-level setting circuit 51 sets in the subtracter 50 any desired one of various reference levels supplied from the CPU 6 to the control register 24. On the basis of the reference level set in it, the subtracter 50 sets the DC cancel voltage at a desired level.

As for the other operations it performs, the read channel 43 is identical to the read channel 42 shown in FIG. 3, i.e., the first modification of the embodiment.

FIG. 5 shows a read channel 44 which is the third modification of the embodiment (FIG. 1). As the comparison of FIGS. 4 and 5 teaches, the third modification differs from the second modification in that an inverter 52 is connected, instead of the DC-level setting circuit 51, between the control register 24 and the subtracter 50. As mentioned above, the subtracter 50 is an operational amplifier and operates in response to the detection signal ON generated by the TA detector 20. By contrast, the inverter 52 is an inverting amplifier. It extracts the read signal (i.e., the input to the HPF 23) and outputs the inverted DC-level signal thereof to the subtracter 50 as the reference-level signal. The subtracter 50 subtracts the inverted DC level from the DC level of the read signal, thereby setting the DC cancel voltage at a desired level.

Figure 8C:
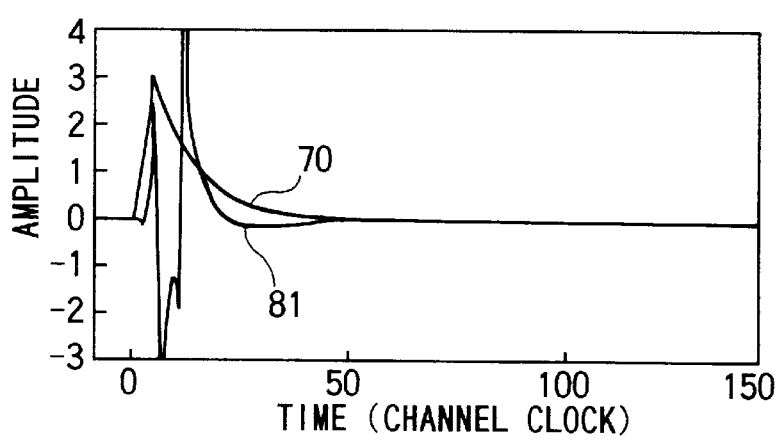

The DC level of the read signal 70 output from the head amplifier 3 may rise above the reference level as shown in FIG. 8C. In this case, the TA detector 20 generates a detection signal ON which lasts for the time the DC level of the signal 70 remains above the reference level. The detection signal ON is supplied to the delay circuit 22 and the subtracter 50. In response to the signal ON the delay circuit 22 generates a hold signal HOLD, which is supplied to the AGC circuit 30 and the read PLL 31. Hence, neither the circuit 30 nor the PLL 31 operates while the delay circuit 22 keeps generating the signal HOLD.

Meanwhile, the subtracter 50 is turned on by the detection signal ON generated by the TA detector 20 and applies a DC cancel voltage to the read signal which is the differential input to the HPF 23. The HPF 23 performs TA compensation, reducing the the DC-level change in the read signal, which has been caused by the thermal asperity (TA). As a result, the DC level of the read signal input to the HPF 23 has a DC level canceled by the inverted DC level for the time corresponding to the period during which the read signal input to the HPF 23 is changing in terms of DC level, as is illustrated in FIG. 8C.

Figure 8D:
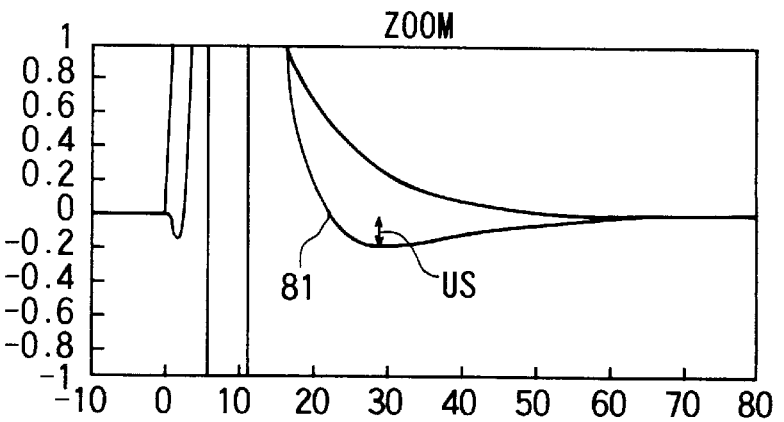

As seen from FIG. 8D which is an enlarged part of FIG. 8C, the output 81 of the LPF 26, i.e., the TA-compensated read signal output by the HPF 23, has its DC undershoot far more reduced than in the conventional read channel (see FIG. 7B). Thus, the HPF 23 not only decreases the change in the DC level of the read signal, but also reduces the DC undershoot of the read signal.

In terms of the other operations it performs, the read channel 44 is identical to the read channel 42 illustrated in FIG. 3.

FIG. 6 shows a read channel 45 which is the fourth modification of the embodiment (FIG. 1). The fourth modification differs from the embodiment in that a subtracter 50 and an exponential amplifier 53 are used in place of the HPF 23. A switch circuit 40 is connected between the TA detector 20 and the subtracter 50. The switch circuit 40 is closed by a detection signal ON from the switch circuit 40, short-circuiting the input of the subtracter 50. The switch circuit 40 maintains the DC level of the read signal at 0 V while the TA detector 20 is detecting a thermal asperity (TA). When the read signal falls to the reference level or a lower level, the change of the DC level starts decreasing exponentially.

Meanwhile, the exponential amplifier 53 (also known as "anti-logarithmic amplifier") receives a reference-level signal from the level control circuit 21 and an exponential time constant from the control register 24. The amplifier 53 applies the exponential time constant to the reference-level signal, thereby generating an inversely exponential DC-level change. The inversely exponential DC-level change is supplied to the subtracter 50.

The subtracter 50 subtracts the inversely exponential DC-level change from the exponential DC- level change in the read signal output from the TA detector 20. As a result, the change in the DC level of the read signal is canceled.

The DC level of the read signal 70 output from the head amplifier 3 may rise above the reference level as shown in FIG. 9A. In this case, the TA detector 20 generates a detection signal ON which lasts for the time the DC level of the signal 70 remains above the reference level. The detection signal ON is supplied to the delay circuit 22 and the subtracter 50. In response to the signal ON the delay circuit 22 generates a hold signal HOLD, which is supplied to the AGC circuit 30 and the read PLL 31. Hence, neither the circuit 30 nor the PLL 31 operates while the delay circuit 22 keeps generating the signal HOLD.

The detection signal ON is supplied also to the switch circuit 40 and the subtracter 50. Both the circuit 40 and the subtracter 50 are turned on and compensate the thermal asperity (TA). Namely, the subtracter 50 subtracts the inversely exponential DC-level change from the exponential DC-level change of the read signal, thus canceling out the exponential DC-level change of the read signal. As a result, the subtracter 50 generates a read signal which has neither a DC undershoot nor a DC-level change resulting from the thermal asperity, as is illustrated in FIG. 9B which is an enlarged part of FIG. 9a.

The read channel 45 is identical to the read channel 41 shown in FIG. 13 in structure and operation, except that the subtracter 50 and exponential amplifier 53 are used in place of the HPF 23, to cancel the change in the DC level of the read signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A data channel for processing a data signal by a PRML system in a disk drive having an MR head, comprising:

TA detecting means for detecting a thermal asperity (TA) from a change in level of a data signal read by the MR head and generating a detection signal representing the thermal asperity (TA);

first compensation means for compensating a change in DC revel of the data signal in accordance with the detection signal generated by said TA detecting means;

second compensation means for compensating a DC undershoot of the data signal in accordance with the detection signal generated by said TA detecting means; and reference level setting means for setting a predetermined reference level, and in which said second compensation means is connected to an input of said first compensation means and has a DC canceling means for changing the DC level of the data signal to a level corresponding the reference level set by said reference level setting means, in accordance with the detection signal generated by said TA detecting means, thereby to cancel DC undershoot contained in the data signal and resulted from TA disturbance present in the data signal.

2. The apparatus according to claim 1, wherein said DC canceling means has a subtracter circuit for subtracting the reference level from the DC level of the data signal, thereby to cancel the DC undershoot contained in the data signal and resulted from TA disturbance present in the data signal.

3. The apparatus according to claim 1, wherein said TA detecting means is designed to compare the DC level of the data signal with the reference level and generates the detection signal when the DC level rises above the reference level, and said reference level setting means is designed to set the reference level at any desired value in said TA detecting means and any other means of the apparatus.

4. The apparatus according to claim 1, wherein said second compensation means is connected to an input of a high-pass filter.

5. A data channel for processing a data signal by a PRML system in a disk drive having an MR head, comprising:

TA detecting means for detecting a thermal asperity (TA) from a change in level of a data signal read by the MR head and generating a detection signal representing the thermal asperity (TA);

first compensation means for compensating a change in DC level of the data signal in accordance with the detection signal generated by said TA detecting means, wherein said first compensation means has a high-pass filter which suppresses TA disturbance present in the data signal before the data signal processing is performed by the PRML system;

second compensation means for compensating a DC undershoot of the data signal in accordance with the detection signal generated by said TA detecting means; and reference level setting means for setting a reference level and in which said second compensation means is connected to an input of said high-pass filter and has a DC canceling means for subtracting the reference level from the DC level of the data signal, in accordance with the detection signal generated by said TA means.

* * * * *